United States Patent [19]

Vallerand

[11] Patent Number: 5,727,838
[45] Date of Patent: Mar. 17, 1998

[54] WIND DEFLECTION APPARATUS FOR PICKUP TRUCKS

[76] Inventor: Ivan Vallerand, 46 Lakeview Ave., Waltham, Mass. 02154

[21] Appl. No.: 510,001

[22] Filed: Aug. 1, 1995

Related U.S. Application Data

[62] Division of Ser. No. 329,208, Oct. 26, 1994, abandoned.

[51] Int. Cl.⁶ .................................................. B62D 35/00
[52] U.S. Cl. ................................... 296/180.1; 296/57.1
[58] Field of Search ........................... 296/180.1, 180.2, 296/57.1, 50

[56] References Cited

U.S. PATENT DOCUMENTS

| | | | |
|---|---|---|---|
| 4,136,905 | 1/1979 | Morgan | 296/57.1 X |
| 4,861,088 | 8/1989 | Fedrigo | 296/180.1 X |
| 4,861,093 | 8/1989 | Chapman | 296/180.1 |
| 4,902,066 | 2/1990 | Norman | 296/180.1 |
| 4,944,546 | 7/1990 | Keller | 414/537 X |
| 5,110,172 | 5/1992 | Ney et al. | 296/180.1 X |
| 5,211,437 | 5/1993 | Gerulf | 414/537 X |
| 5,271,656 | 12/1993 | Hull et al. | 296/180.1 |
| 5,352,008 | 10/1994 | Denvir | 296/180.1 X |
| 5,411,312 | 5/1995 | Stallings | 296/180.1 |

*Primary Examiner*—Joseph D. Pape

[57] ABSTRACT

The invention provides embodiments of a tailgate for a pickup truck having a truck bed which includes a floor. Generally, the tailgate is comprised of a rectangular sheet of rigid metal having a plurality of openings through which air can pass through. Means for attaching the tailgate to the pickup truck are also provided.

4 Claims, 4 Drawing Sheets

WIND DEFLECTION APPARATUS FOR PICKUP TRUCKS

This is a divisional of application Ser. No. 08/329,208, filed on Oct. 26, 1994, abandoned.

BACKGROUND OF THE INVENTION

The present invention relates to a wind deflector for use in removing wind pressure in the bed of a pickup truck. The present invention also relates to a tailgate for a pickup truck which is designed to relieve the wind pressure in the bed of the truck.

As can be appreciated, wind hitting up against the tailgate in a pickup truck as the truck moves serves to counteract forward movement of the truck.

Accordingly, it is an object of this invention to provide a device which can be attached to the tailgate of an open top pickup truck for use in diverting wind pressure in the bed of the truck as the truck moves.

It is another object of this invention to provide a tailgate for an open top pickup truck which is constructed to reduce wind pressure in the bed of the truck as it moves.

SUMMARY OF THE INVENTION

According to one version of the invention, there is provided a tailgate for a pickup truck having a truck bed, the truck bed including a floor, the tail gate comprising a generally rectangular sheet of rigid material having a plurality of openings through which air can pass through, and means for attaching the tailgate to the truck.

In another version of the invention there is provided a wind deflector which comprises a top plate and three hingedly connected panels and in other embodiments of the invention there is provided a tailgate having a pair of plates, one solid and one with openings the two plates being movable relative to one another, in another version of the invention there is provided a tailgate which can be fixed in place at any one of a number of angular positions and in still another version of the invention a tailgate is provided which includes a solid plate adapted to be pivotally attached to the back of a pickup truck and a plate having openings slidably mounted in a pair of channels attached to the sidewalls of the bed of the truck. Various features and advantages will appear from the description to follow. In the description, reference is made to the accompanying drawings which forms a part there of, and in which is shown by way of illustration, specific embodiments for practicing the invention. These embodiments will be described in sufficient detail to enable those skilled in the art to practice the invention, and itis to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF PREFERRED EMBODIMENTS

Figure 1:
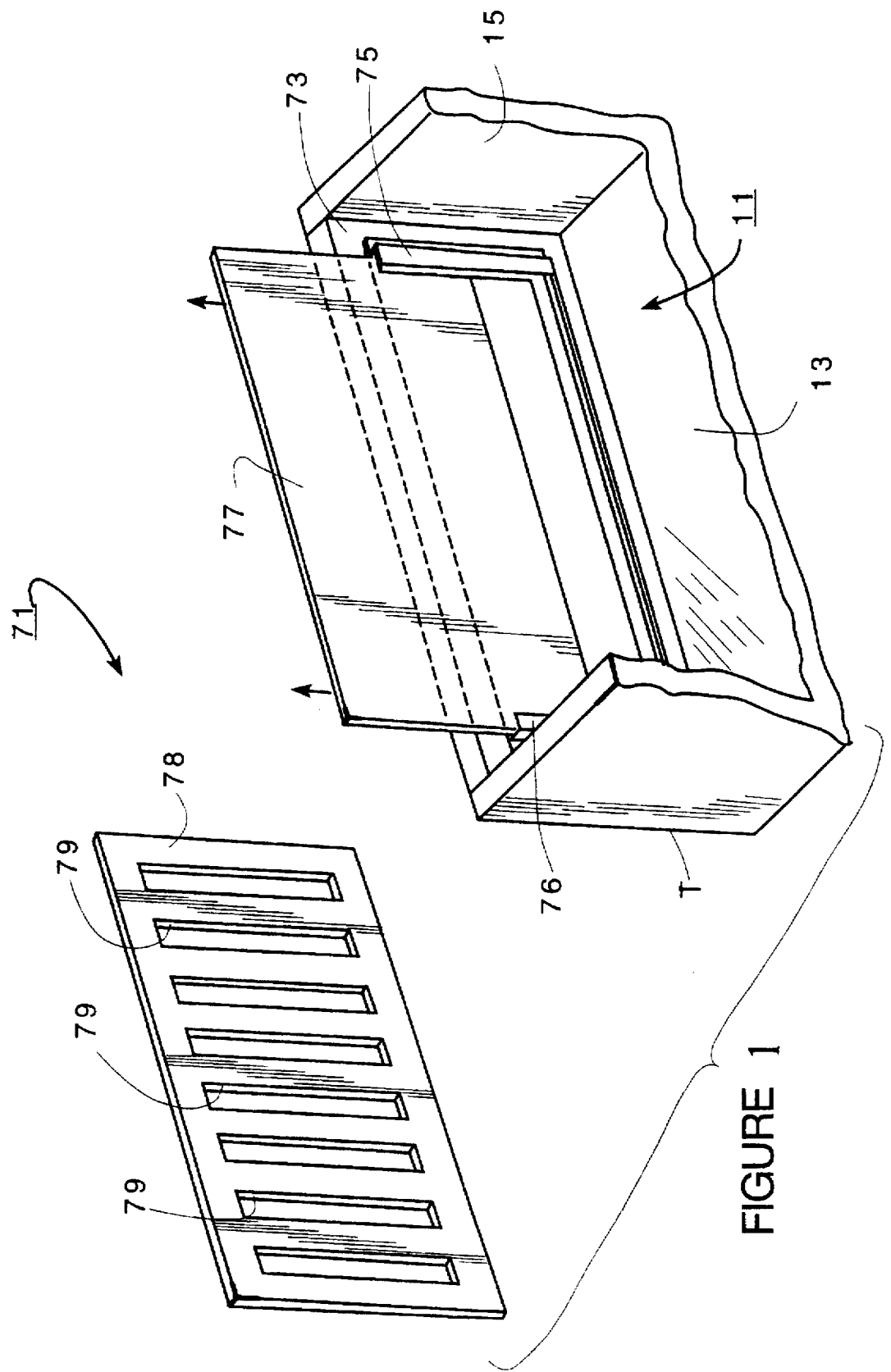
FIG. 1 is a pictorial view of another version of a tailgate constructed according to this invention and a replacement panel for use therewith.

In FIG. 1 is shown another version of a tailgate constructed according to this invention and identified by reference numeral 71. Tailgate 71 includes a rectangular frame 73 open in the middle, a pair of L shaped brackets 75 and 76, a solid rectangular main panel 77 slidably and removably mounted on frame 73 through brackets 75 and 76 and a rectangular replacement panel 78 having openings 79. In use and when so desired, solid main panel 77 is removed from frame 73 and replaced with panel 78.

Figure 2:
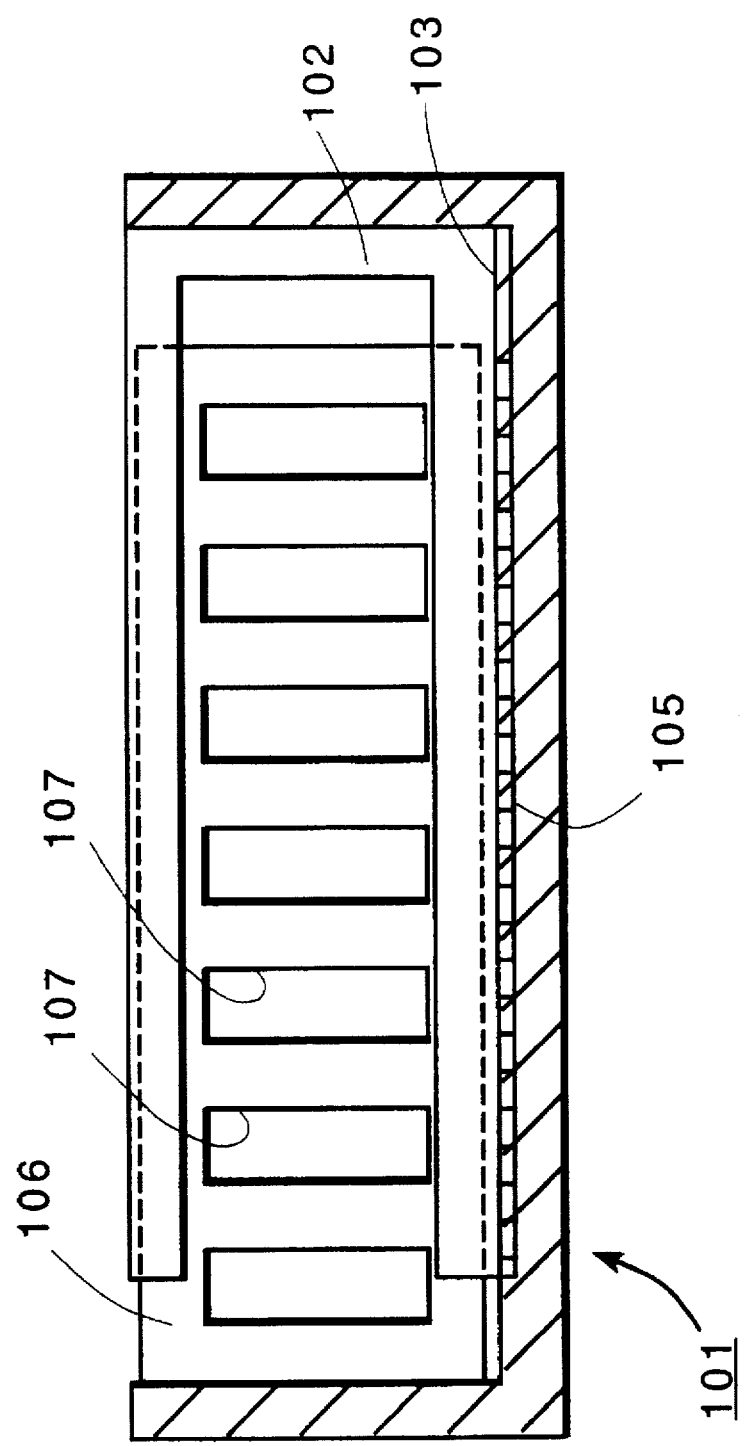
FIG. 2 is a side view partly in section of another version of a tailgate constructed according to this invention.

In FIG. 2 is shown another version of a tailgate 101 according to this invention. Tailgate 101, which is adjustable in width, to accommodate trucks having different widths includes a U shaped frame 102 channel shaped in lateral cross-section which pivotally attached to the floor 103 of a truck bed 104 by a hinge 105 and a rectangular plate 106 slidably mounted in frame 102 and having a plurality of openings 107.

Figure 3:
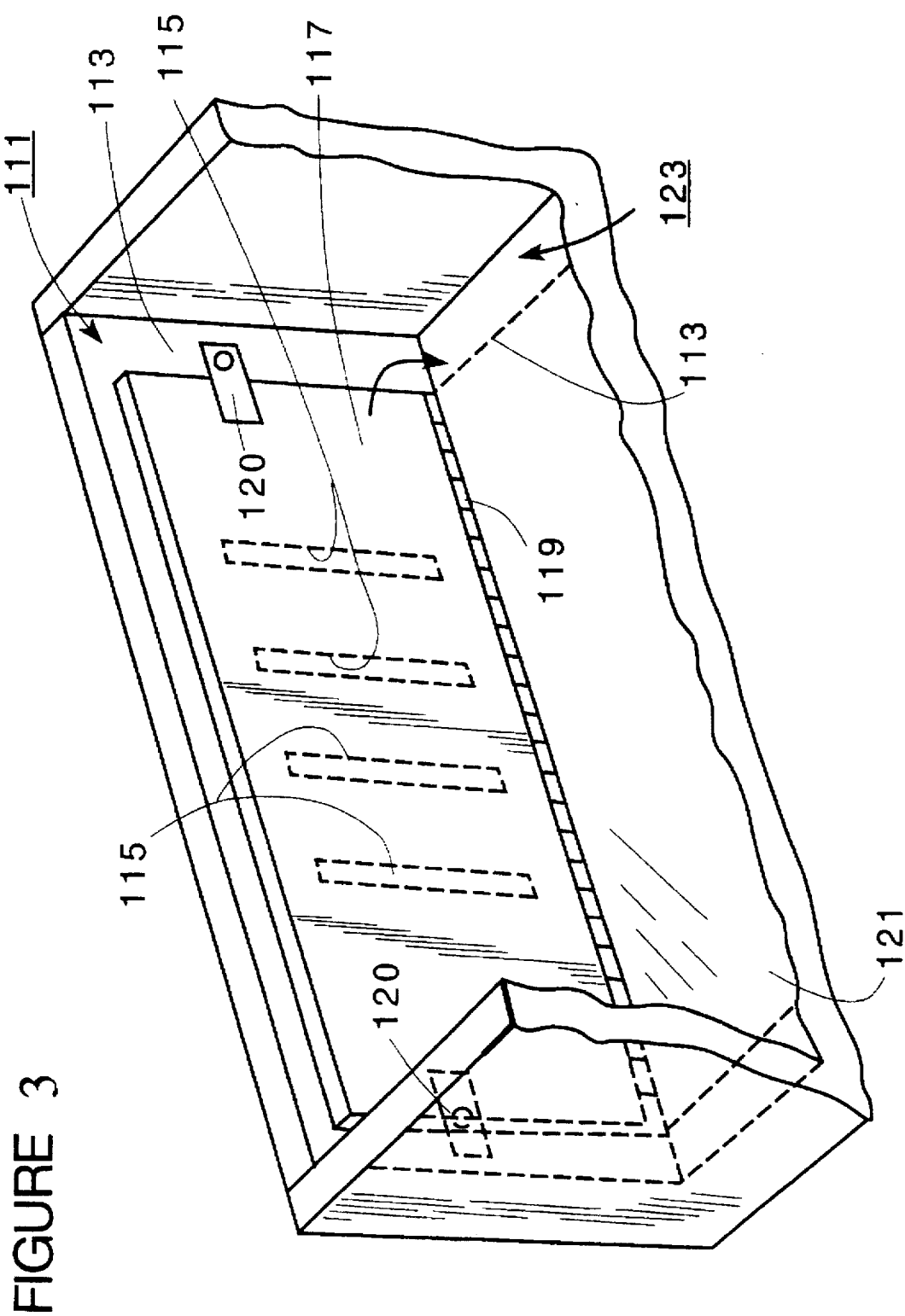
FIG. 3 is a pictorial view of another version of a tailgate constructed according to this invention.

In FIG. 3 is shown another version of a tailgate 111 according to this invention. Tailgate 111 includes a rectangular panel 113 having a plurality openings 115 and a solid panel 117 pivotally attached to floor 121 by a hinge 119 and held in place by locking brackets 120. When desired, panel 117 may be pivoted down so that it rests on the floor 121 of truck bed 123 and the wind passes through openings 115 as the truck moves rather than simply up against panel 113.

Figure 4:
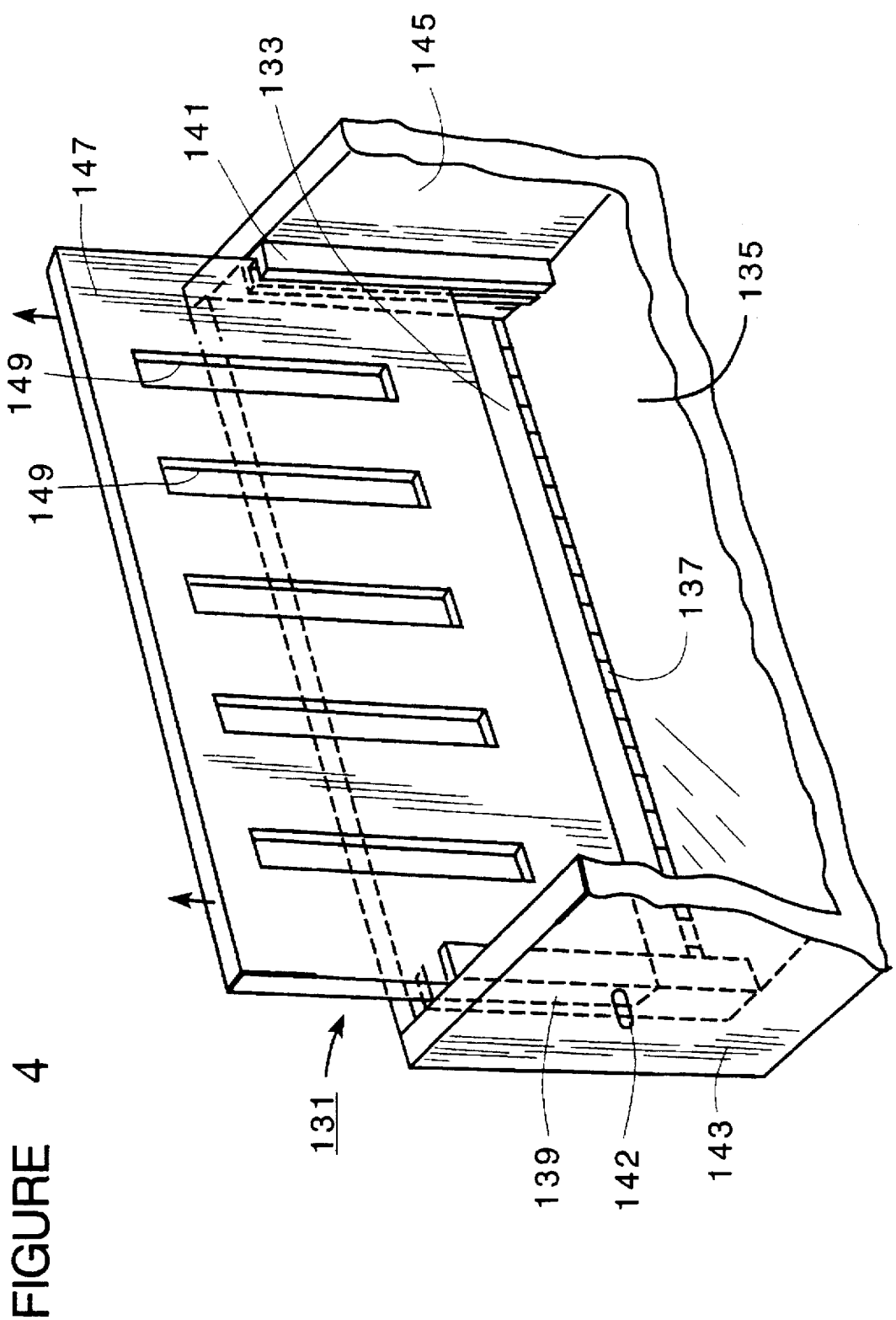
FIG. 4 is a pictorial view of another version of a tailgate constructed according to this invention.

FIG. 4 is shown another version of a tailgate constructed according to this invention and identified by reference numeral 131. Tailgate 131 includes a solid rectangular plate 133 pivotally attached to the floor 135 of a truck bed by a hinge 137, a pair of channel members 139 and 141 fixedly attached to the sidewalls 143 and 145, respectively, of the truck bed and a rectangular plate or panel 147 having openings 147 slidably and removably mounted in channel members 139 and 141 and held in place therewith by pins 142 which extend through holes (not shown) in the plate and the channels. When so desired, plate 133 may be pivoted down and plate 147 inserted in channels 139 and 141. When so arranged, air will pass through opening 149 as the truck moves.

What is claimed is:

1. A tailgate assembly for an open top pickup, said open top pickup truck having a truck bed including a floor and a rear end, the tail gate assembly comprising:
   a. a first sheet of material having a plurality of openings through which air can pass through,
   b. means for mounting said first sheet on said truck bed at the rear end, and
   c. a second sheet of material removably and slidably associated with said first sheet thereby selectively exposing or covering said plurality of openings.

2. A tailgate assembly for an open top pickup truck the tail gate assembly comprising:
   a. a U shaped frame,
   b. means for pivotally attaching said U shaped frame to the floor of a pickup truck, and
   c. a plate having a plurality of openings telescopingly mounted in said U shaped frame.

3. A tailgate assembly for an open top pickup truck the tail gate assembly comprising:
   a. a first, rectangular panel adapted to be mounted on the back of said truck, said panel having a plurality of openings, b. a second rectangular panel pivotally attached to the first panel, said second panel being solid, and c. means for locking said second panel in place against said first panel comprising a pair of locking brackets.

4. A tailgate assembly for a truck having an open truck top bed, said truck bed including a floor and a pair of sidewalls, the tail gate comprising a first rectangular sheet of rigid material, means for pivotally attaching said first rectangular sheet to said floor, a second rectangular sheet of material having at least one opening, and a means for slidably and removably mounting said second rectangular sheet of material having at least one opening on the sidewalls of the truck bed.

* * * * *